(12) United States Patent
Hindelang et al.

(10) Patent No.: US 11,535,727 B2
(45) Date of Patent: Dec. 27, 2022

(54) METHOD FOR PRODUCING HYDROPHOBIC SILICA MOULDINGS

(71) Applicant: WACKER CHEMIE AG, Munich (DE)

(72) Inventors: Konrad Hindelang, Munich (DE); Dominik Jantke, Eching (DE); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 647 days.

(21) Appl. No.: 16/338,196

(22) PCT Filed: Feb. 27, 2017

(86) PCT No.: PCT/EP2017/054474
§ 371 (c)(1),
(2) Date: Mar. 29, 2019

(87) PCT Pub. No.: WO2018/153495
PCT Pub. Date: Aug. 30, 2018

(65) Prior Publication Data
US 2020/0172706 A1  Jun. 4, 2020

(51) Int. Cl.
*C08G 77/16* (2006.01)
*C08K 9/06* (2006.01)
*C08K 3/36* (2006.01)
*C09C 1/30* (2006.01)

(52) U.S. Cl.
CPC ............ *C08K 9/06* (2013.01); *C08G 77/16* (2013.01); *C08K 3/36* (2013.01); *C09C 1/3081* (2013.01); *C01P 2006/12* (2013.01); *C08K 2201/006* (2013.01)

(58) Field of Classification Search
CPC ...... C08K 9/06; C08K 3/36; C08K 2201/006; C09C 1/3081; C08G 77/16
See application file for complete search history.

(56) References Cited

U.S. PATENT DOCUMENTS

| | | | |
|---|---|---|---|
| 2012/0286189 A1 | 11/2012 | Barthel et al. | |
| 2014/0150242 A1 | 6/2014 | Kratel et al. | |
| 2015/0368440 A1* | 12/2015 | Scholz | C09C 1/30 524/266 |
| 2017/0233297 A1 | 8/2017 | Albinus et al. | |
| 2019/0393554 A1* | 12/2019 | Noguchi | H01M 4/505 |
| 2022/0087224 A1* | 3/2022 | Gallagher | A01K 15/026 |

FOREIGN PATENT DOCUMENTS

| | | |
|---|---|---|
| DE | 102007020716 A1 | 11/2008 |
| DE | 102009054566 A1 | 11/2010 |
| EP | 0032176 B2 | 4/1992 |
| EP | 2736979 B1 | 4/2016 |
| EP | 2781558 B1 | 12/2016 |
| EP | 2982660 B1 | 10/2018 |
| JP | 2008201900 * | 9/2008 |

OTHER PUBLICATIONS

JP 2008 201900 machine translation (2008).*

* cited by examiner

*Primary Examiner* — Kuo Liang Peng
(74) *Attorney, Agent, or Firm* — Brooks Kushman P.C.

(57) ABSTRACT

The invention relates to a method for producing hydrophilic silicia moulded bodies, in which i) a mixture containing hydrophilic silicic acid is added at a maximum temperature of 55° C. to hydrophobic means and ii) the mixture obtained in step i) is compacted after a maximum storage time of 30 days to form moulded bodies, iii) during steps ii and iii and until the moulded bodies are used, the temperature is at a maximum of 55° C.

19 Claims, No Drawings

METHOD FOR PRODUCING HYDROPHOBIC SILICA MOULDINGS

CROSS-REFERENCE TO RELATED APPLICATIONS

This application is a U.S. National Phase Application of PCT/EP2017/054474, filed Feb. 27 2017 the contents of which are incorporated herein by reference in their entireties for all purposes.

FIELD OF THE INVENTION

BACKGROUND OF THE INVENTION

The invention relates to a process for producing hydrophobic silica moldings at low temperature.

Thermal insulation for saving energy has attained high importance in the context of consciousness for sustainable development and the increasing cost of energy and also an increasing shortage of fossil raw materials. These requirements for optimization of thermal insulation apply equally to buildings, i.e. to new buildings or existing buildings, and to thermal insulation in the logistical or stationary sector.

For durable insulation which has low thermal conduction and also low combustibility, the focus is increasingly on inorganic, porous materials.

Organic insulating materials (e.g. polystyrene) are increasingly coming under pressure because of their combustibility and sometimes problematical disposal. It is therefore desirable to produce insulating materials having a very low combustibility.

Porous, inorganic materials such as pyrogenic or precipitated silicas display good insulation properties and are also noncombustible.

Pyrogenic silicas are prepared by flame hydrolysis of volatile silicon compounds, e.g. organic and inorganic chlorosilanes, in a hydrogen and oxygen flame. The silicas prepared in this way have a porous structure and are hydrophilic.

Precipitated silicas are prepared from water glass by a precipitation process. The term water glass refers to vitreous, i.e. amorphous, water-soluble sodium, potassium and lithium silicates solidified from a melt or aqueous solutions thereof.

Neutralization of the salt, hydrolysis and condensation forms particulate $[SiO_{4/2}]$ compounds from the chain-like Si—O—Si compounds.

Such particulate systems have good thermal insulation properties even in a loose bed without compaction. In the building sector, the finely divided structure of the precipitated or pyrogenic silicas leads to difficulties in processing, for instance severe dust formation.

Mixing of silicas with fibers and subsequent pressing makes it possible to produce moldings such as plates which are significantly easier to handle than silica powders.

For use as thermal insulation, in particular in the insulation of buildings, such hydrophilic materials are, however, not readily usable since hydrophilic silicas display undesirably high moisture absorption, as a result of which the thermal insulation properties, inter alia, decrease.

Completely hydrophobic moldings would be obtained by compaction of hydrophobic silicas. However, a person skilled in the art will know that hydrophobic silicas cannot be compacted sufficiently and are not pressable. Likewise, a pressing of a mixture provided with hydrophobic silica is not possible.

EP 2 736 979 B1 therefore proposes that the hydrophobicization be carried out after the pressing operation. Here, the hydrophilic molding is, after the pressing operation, reacted with at least one gaseous organosilane in a chamber by means of a combination of subatmospheric pressure and superatmospheric pressure. A disadvantage here is that the equipment for the pressure-swing process is complicated and the process is therefore difficult to implement on an industrial scale.

EP 2 982 660 A1 describes a process for producing hydrophobic insulation boards, in which a hydrophilic mixture is firstly precompacted, the board produced in this way is reacted with a gaseous hydrophobicizing agent and is subsequently pressed to the final density. The use of gaseous hydrophobicizing agents and the application of subatmospheric pressure or elevated temperatures for vaporizing the silylating agent make this process complicated.

EP 0 032 176 B1 describes a process for producing hydrophobic thermal insulation by mixing silica, fibers and organosilicon compounds. The mixture is stored before pressing in order to allow reaction of the organosilicon compound with the silica. It was thus not recognized that the use of a freshly coated silica is advantageous compared to a stored and heated silica.

Completely hydrophobic thermal insulation is obtained, for example, by applying the hydrophobicizing agent to the silica before pressing. Thus, DE 10 2009 054 566 A1 describes the production of completely hydrophobic thermal insulation by pressing mixtures of silica, fibers and relatively nonvolatile organosilanes or organosiloxanes. Volatile components are subsequently removed by baking ([0025]+ examples). However, the heat treatment step incurs additional costs.

DE 10 2007 020 716 A1 describes hydrophobic hollow building block fillings produced from silicas which are coated with volatile organosilanes and are then immediately pressed. A problem here is the liberation of dissociation products, in particular volatile organic degradation products. These are removed by heating ([0040]+examples).

BRIEF SUMMARY OF THE INVENTION

It is an object of the invention to provide an economical process which can be carried out continuously for producing hydrophobic siliceous moldings.

The invention provides a process for producing hydrophobic silica moldings, wherein
i) a mixture containing hydrophilic silica is coated with hydrophobicizing agent at a temperature of not more than 55° C. and
ii) the mixture from step i is, after a storage time of not more than 30 days, compacted to give moldings,
iii) where the temperature is not more than 55° C. during steps i and ii and up to use of the moldings.

DETAILED DESCRIPTION OF PREFERRED EMBODIMENTS

The process gives mechanically stable, hydrophobic, siliceous moldings, in particular plates or mats, in a simple way. The hydrophobicizing agent reacts completely only during or after the compaction step ii.

It has surprisingly been found that silica freshly coated with a suitable hydrophobicizing agent behaves like hydrophilic silica in respect of its suitability for granulation. This special effect is lost when the coated silica is heated.

It is stated in EP 2 781 558 A1 that a silica coated at low temperatures with a short-chain OH-terminated polydimethylsiloxane has a significantly lower hydrophobicity (determined via methanol wettability) compared to a heated silica. In addition, it is stated that the hydrophobicity increases slowly during storage. An advantage of this silica compared to the prior art is said to be shorter incorporation times into rubbers. A positive effect on the compaction properties, for example for producing insulation materials, is not disclosed. The process disclosed in the present invention has surprisingly allowed the hydrophobicizing agent to be mixed in before the compaction step. The hydrophobicizing agent is therefore also present in the core of the insulation boards. The processing properties during the pressing operation are not adversely affected here. As a result, standard equipment can be used for producing plates or mats and complicated process steps such as subsequent hydrophobicization and heating can be dispensed with.

Since preference is given to using hydrophobicizing agents which do not eliminate any volatile organic compounds (VOCs) in the reaction with the Si—OH groups, no heat treatment (also referred to as purification) for removing the volatile constituents (e.g. elimination products) has to be carried out after coating and granulation.

In order for the coated silica to be able to be compacted efficiently and for stable plates to be formed, it is ensured that the temperature in step i of the coating procedure is not more than 55° C., preferably not more than 40° C., particularly preferably not more than 25° C.

The temperature in all process steps, including the time after compaction in step ii up to use in the application (e.g. installation of further processing to give insulation systems), is preferably not more than 55° C., more preferably not more than 40° C., particularly preferably not more than 25° C. 55° C. is sufficient for development of the hydrophobicity of the moldings.

Apart from the better compactability and the improved product properties, these temperature conditions make it possible for residues arising in the process to be recirculated to steps i and ii. In addition, additional process steps and energy costs can be saved compared to the processes with heating and/or purification steps. The process can, in particular, be carried out continuously in all steps because of the low temperatures and the omission of pressure change.

Silica

All hydrophilic silicas known to those skilled in the art can be used in the processes of the invention. Preference is given to using pyrogenic silicas or precipitated silicas or mixtures thereof. Further preference is given to silicas having a BET surface area in accordance with DIN 66131 (determined using nitrogen) in the range from 50 to 800 $m^2/g$, particularly preferably from 100 to 500 $m^2/g$ and in particular silicas having a surface area in the range from 150 to 400 $m^2/g$. For the purposes of the present invention, hydrophilic means that the Si—OH groups on the surface are accessible and the silicas can be wetted by water. Particular preference is given to using pyrogenic silicas having BET surface areas in the range from 150 to 400 $m^2/g$.

Additives

As further components, it is possible, in particular in step i, to add additives which can absorb, scatter or reflect thermal radiation in the infrared range. They are generally referred to as IR opacifiers. These opacifiers preferably have a maximum in the IR spectral range at preferably from 1.5 to 10 m. The particle size of the particles is preferably 0.5-15 μm. Examples of such substances are preferably titanium oxides, zirconium oxides, ilmenites, iron titanates, iron oxides, zirconium silicates, silicon carbide, manganese oxides and carbon black.

Furthermore, in order to reduce electrostatic charging, all additives known to those skilled in the art for reducing electrostatic charging, for instance conductive alkylammonium salts, can be added if necessary.

For technical and/or economic reasons, further fillers can be added. Preference is here given to using synthetically produced modifications of silicon dioxide, e.g. aerogels, precipitated silicas, electric arc silicas, $SiO_2$-containing fly dusts which are formed by oxidation of volatile silicon monoxide in the electrochemical production of silicon or ferrosilicon. Likewise silicas which are produced by leaching of silicates such as calcium silicate, magnesium silicate and mixed silicates, for example olivine, with acids. Naturally occurring $SiO_2$-containing compounds such as diatomaceous earths and kieselguhrs are also employed.

The mixture containing hydrophilic silica which is coated with hydrophobicizing agent in step i preferably contains at least 80% by weight, particularly preferably at least 90% by weight, in particular at least 95% by weight, of hydrophilic silica.

In a preferred embodiment, mechanical reinforcement or armoring is effected by use of fibrous materials. These increase the mechanical stability of the overall system (example 1 compared to example 4). For armoring, i.e. for mechanical reinforcement or strengthening, use is made of fibers. These fibers can be of inorganic or organic origin. Example of inorganic fibers are glass wool, rock wool, basalt fibers, slag wools and ceramic fibers which consist of melts of aluminum and/or silicon dioxide or further inorganic metal oxides. Pure silicon dioxide fibers are, for example, silica fibers. Organic fibers are, for example, cellulose fibers, textile fibers or synthetic fibers. Preference is given to using organic fibers based on cellulose (viscose staple fiber). For toxicological reasons and sustained ability aspects (disposal), preference is given to not using any crystalline, inorganic fibers, for example asbestos fibers, for the purposes of the present invention. Fibers having a length of from 1 to 25 mm, particularly preferably from 3 to 10 mm, are preferably used. The diameter of the fibers is preferably from 1 to 12 μm and particularly preferably from 6 to 9 μm. In a preferred embodiment, the proportion of fibers, based on the total mixture, is preferably from 0.5 to 20% by weight, more preferably from 3 to 10% by weight.

Hydrophobicizing Agent

As hydrophobicizing agent, it is possible to use all materials known to those skilled in the art for hydrophobicizing silicas, in particular organosilicon compounds (e.g. organosilanes, organosiloxanes or silicone resins) and hydrocarbons (e.g. paraffins, waxes, carboxylic acids, in particular fatty acids). Reactive organosilanes, organosiloxanes or silicone resins which are liquid at 25° C. and have hydrophobicizing properties and are capable of reacting with the Si—OH groups of the silica surface are preferably used as hydrophobicizing agents.

The organosilanes, organosiloxanes or silicone resins can be used in pure form or in any mixtures.

The reactivity of the organosilanes, organosiloxanes or silicone resins used is preferably selected so that the hydrophobicizing effect has not been developed completely before the compaction step ii.

Preference is given to using organosilanes, organosiloxanes or silicone resins which, during the reaction with the Si—OH groups of the silica, eliminate not more than 1% (not more than 0.1%, not more than 0.01%) of volatile organic and/or corrosive compounds, based on the mass of the mixture, with these compounds preferably being $CH_3OH$, $CH_3CH_2OH$, $CH_3COOH$, $HCl$, $NH_3$.

As hydrophobicizing agents, preference is given to using organosilanes of the general formula $$R^1_n R^2_m SiX_{4-(n+m)} \quad (I),$$

where n and m can be 0, 1, 2, or 3 and the sum of n+m is less than or equal to 3 and $R^1$ is a saturated or monounsaturated or polyunsaturated, monovalent Si—C-bonded $C_1$-$C_2$-hydrocarbon radical which may optionally be substituted by —CN, —NCO, —NR$^3$, —COOH, —COOR$^3$, -halogen, -acryl, -epoxy, —SH, —OH or —CONR$^3$2, preferably a $C_1$-$C_{13}$-hydrocarbon radical, or an aryl radial or $C_1$-$C_{15}$-hydrocarbonoxy radial, preferably a $C_1$-$C_8$-hydrocarbonoxy radial, particularly preferably a $C_1$-$C_4$-hydrocarbonoxy radical, in which in each case one or more nonadjacent methylene units can be replaced by —O—, —CO—, —COO—, —OCO— or —OCOO—, —S— or —NR$^3$— end groups and in which one or more nonadjacent methine units can be replaced by —N=, —N=N- or —P=groups, where $R^2$ is hydrogen or a saturated or monounsaturated or polyunsaturated, monovalent Si—C-bonded $C_1$-$C_{20}$-hydrocarbon radial which may optionally be substituted by —CN, —NCO, —NR$^3$, —COOH, —COOR$^3$, -halogen, -acryl, -epoxy, —SH, —OH or —CONR$^3$2, preferably a $C_1$-$C_{18}$-hydrocarbon radical, or an aryl radical or $C_1$-$C_{15}$-hydrocarbonoxy radical, preferably a $C_1$-$C_8$-hydrocarbonoxy radical, particularly preferably a $C_1$-$C_4$-hydrocarbonoxy radical, in which in each case one or more nonadjacent methylene units can be replaced by —O—, —CO—, —COO—, —OCO— or —OCOO—, —S—, or —NR$^3$— groups and in which one or more nonadjacent methine units can be replaced by —N=, —N=N- or —P=groups, where $R^3$ has the same meaning as $R^2$, and $R^2$ and $R^3$, can be identical or different, X is a C—O bonded $C_1$-$C_{15}$-hydrocarbon radical, preferably a $C_1$-$C_8$-hydrocarbon radical, particularly preferably a $C_1$-$C_3$-hydrocarbon radical, or an acetyl radical or a halogen radical, preferably chlorine, or hydrogen or an OH radical, or $$R^{11}_i R^{22}_j Si-Y-SiR^{11}_i R^{22}_j \quad (II)$$

where $R^{11}$ has the meaning of $R^1$ and $R^{22}$ has the meaning of $R^2$, i and j can be 0, 1, 2 or 3 and the sum of i+j is 3 and Y can be the group NH or —O—.

Preference is given to using chain-like or cyclic, branched or unbranched organosiloxanes consisting of building blocks of the general formulae $$(R^4_a ZbSiO_{1/2}) \quad (III-a)$$

$$(R^4_2 SiO_{2/2}) \quad (III-b)$$

$$(R^4 SiO_{3/2}) \quad (III-c)$$

$$(R^4 R^5 SiO_{2/2}) \quad (III-d)$$

$$(SiO_{4/2}) \quad (III-e),$$

where the building blocks can be present in any mixtures, where $R^4$ has the meaning of $R^1$ and $R^5$ has the meaning of $R^2$, and Z has the meaning of X and can in each case be identical or different, and a and b can be 0, 1, 2, or 3, with the proviso that the sum of a+b is 3.

Preference is given to using cyclic organosiloxanes.

Preference is also given to using chain-like organofunctional organopolysiloxanes consisting of preferably 2 building blocks of the general formula III-a and preferably from 1 to 100 000 building blocks of the general formula III-b and preferably from 1 to 500 building blocks of the general formula III-d, preferably from 1 to 50 000 building blocks of the general formula III-b and preferably from 1 to 250 building blocks of the general formula III-d, particularly preferably from 1 to 10 000 building blocks of the general formula III-b and preferably from 1 to 200 building blocks of the general formula III-d, and very particularly preferably from 1 to 5000 building blocks of the general formula III-b and from 1 to 100 building blocks of the general formula III-d, where $R^4$ is preferably methyl and $R^5$ is preferably —$CH_2$—$CH_2$—$CH_2$—$NH_2$ or —$CH_2$—$CH_2$—$CH_2$—NH—$CH_2$—$CH_2$—$NH_2$.

Preference is given to using chain-like organopolysiloxanes which preferably consist of 2 building blocks of the general formula III-a and preferably from 1 to 100 000 building blocks of the general formula III-b, preferably from 1 to 50 000 building blocks of the general formula III-b, particularly preferably from 1 to 10 000 building blocks of the general formula III-b, and particularly preferably from 1 to 5000 building blocks of the general formula III-b, where $R^4$ is preferably methyl. Particular preference is given to using chain-like organosiloxanes whose $R^4$ is preferably methyl and whose Z is preferably —OH.

The kinematic viscosity of the organosiloxanes measured at 25° C. is preferably from 1 mm$^2$/s to 100 000 mm$^2$/s, preferably from 2 mm$^2$/s to 10 000 mm$^2$/s and particularly preferably from 5 mm$^2$/s to 1000 mm$^2$/s.

Especial preference is given to using OH-terminated polydimethylsiloxanes which preferably have a kinematic viscosity measured at 25° C. of from 5 mm$^2$/s to 100 mm$^2$/s.

Preference is also given to using crosslinked or partially crosslinked organopolysiloxanes known as silicone resins; these are preferably organopolysiloxanes which contain building blocks of the general formula III-a and building blocks of the general formula III-e, particularly preferably with $R^4$=methyl, a=3 and b=0, or organopolysiloxanes which preferably contain building blocks of the general formula III-c and building blocks of the general formula III-b, particularly preferably with $R^4$=methyl.

Amount of Hydrophobicizing Agent

The amounts of hydrophobicizing agent added in step i depend on the specific surface area (BET surface area) of the silicas, the proportion of these in the mixture, the type of silanes or siloxanes and also the hydrophobicity necessary for the end application. The amount added is preferably in the range from 0.5 to 20% by weight, preferably from 1 to 15% by weight, particularly preferably from 5 to 10% by weight, in each case based on the total mixture.

Production of the Mixture

In a preferred embodiment, the components are mixed. The hydrophobicizing agent is preferably added in liquid form during production of the mixture; here, it is necessary for intimate mixing of the individual components to take place. Adsorption of the hydrophobicizing agent is preferably effected by spraying of the silica with the liquid hydrophobicizing agent in a moving bed or in a fluidized bed.

The temperature is generally selected so that the hydrophobicizing agent used does not yet react completely with the silanol groups of the silica surface during the mixing operation in step i and before compaction. As a result of this temperature setting, the coated silica behaves largely like a hydrophilic silica in respect of processability in terms of compaction to give moldings, in particular pressing of plates and mats. This is critical for the production of insulation plates having an optimal combination of hydrophobicity and mechanical stability. If this temperature is exceeded even for only a few hours, the silica mixture behaves like a hydrophobic HDK having a comparable carbon content in respect of the compressibility and resulting product stability (see also example 1 compared to comparative example 2).

The addition rate and the after-stirring time for the hydrophobicizing agent are generally selected so that intimate mixing is ensured.

Fibers can be added to the mixture before step ii. When fibers are used, these can be added to the mixture in step i before, during or after coating with the hydrophobicizing agent. Since excessively long mechanical stressing, e.g. by means of intensive stirring, can lead to breaking of the fibers and the stabilizing effect can therefore decrease, the fibers are, in a preferred embodiment, added after the hydrophobicizing agent has been mixed in.

The mixture is stored only briefly after step i and before pressing in step ii. The storage time of the mixture is generally selected so that the hydrophobicizing agent used does not yet react completely with the silanol groups of the silica surface during the mixing process, before deaeration and before compaction (see also example 1 compared to comparative example 3).

Pressing After the mixing operation, compaction is carried out by pressing the powder mixture obtained. The powder mixture preferably has a bulk density in the range from 40 to 180 g/L, preferably from 40 to 90 g/L, after completion of the mixing operation. The powder mixtures produced have good powder flow and can readily be introduced into molds or applied to belts and subsequently compacted.

Since silicas, in particular pyrogenic silicas, or silica-containing mixtures usually have very low bulk densities, the mixture from step i is preferably deaerated, i.e. the air is removed before pressing, before densification to a target density is carried out. Deaeration of the mixture from step i results in the plates or mats obtained not expanding again or becoming cracked after the pressing operation.

Satisfactory deaeration can, for example, be achieved by very slow compaction. Such slow compaction steps are not economically feasible for large-scale, in particular continuous, production. It is therefore advantageous to deaerate the mixture containing silica actively. This can, for example, be effected by use of reduced pressure (see example 5). Here, a decrease in volume of the mixture can take place during deaeration. The deaeration and subsequent compaction to give plates or mats can be carried out either in different apparatuses or in one apparatus which performs both functions.

Continuous production of plates or mats can, for example, be carried out by pressing of the mixture between belts, with the belts preferably being gas-permeable to achieve sufficient deaeration of the material.

The storage time until compaction is preferably not more than 15 days, particularly preferably not more than 1 week, in particular not more than 3 days, very particularly preferably not more than 24 hours, and the material is especially preferably compressed immediately to a target density.

The desired shape and density of the future insulating molding is brought about by the compaction.

Defined shapes such as plates, mats, cylinders, hollow cylinders or complex shaped parts are preferably produced. For the purpose of the present invention, complex shaped parts are, for example, components for electrical appliances, automobile applications, refrigeration appliances, etc.

Shapes such as powders, granular materials, fragments, splinters and other irregularly shaped particles are not encompassed by the invention.

Compaction is preferably carried out by means of hydraulic pressing, belt pressing, rolling or further methods known to those skilled in the art for producing moldings from powder mixtures. The porosity and thus also the thermal insulating effect of the resulting moldings can be influenced by setting of the density. The thermal conductivity of the moldings is preferably in the range from 18 to 35 mW/(m*K), preferably from 20 to 28 mW/(m*K) and in particular from 20 to 25 mW/(m*K).

The mechanical stability of the moldings can also be influenced by the density set. A higher density generally leads to more stable moldings. The density of the moldings after the pressing operation is preferably in the range from 100 to 400 g/L, particularly preferably from 150 to 300 g/L and in particular from 180 to 260 g/L.

In contrast to other processes in which a heat treatment is carried out during or after compaction, residues obtained in the process and during use of the moldings, for example fines from cutting to size and other scrap, e.g. as a result of working the moldings (e.g. drilling, milling, etc.), can be recirculated to the preceding process steps. The residues are preferably comminuted again before recirculation or directly during production of the mixture (step i) (example 7). Recirculation of the residues obtained preferably takes place within the storage time defined for the mixture. This closed procedure is particularly advantageous for industrial implementation since no undesirable by-products (e.g. scrap, reject material, wastes from milling or drilling etc.) are obtained in this way.

Apart from the use of fibers in the mixture, armoring, lamination, envelopment or other treatment of the surface of the plates or mats can be carried out to effect mechanical strengthening or for reducing dust formation. The application of this armoring or lamination can be carried out during or after the pressing operation. All materials known for this purpose to a person skilled in the art (e.g. tiles, woven fabrics, films) can be used. If necessary, suitable binders or adhesives can also be used to obtain improved adhesion.

After pressing to the target density, the hydrophobicizing agent can react with the silanol groups of the silica, as a result of which the hydrophobicity of the insulation plate or mat preferably increases.

No additional process step, in particular no heat treatment, is necessary for this purpose for developing sufficient hydrophobicity. This simplifies the process and minimizes the energy costs (example 1 compared to comparative example 1). The storage time of the plates and mats is, at room temperature, preferably at least 3 days, preferably at least one week, particularly preferably at least two weeks. The hydrophobicity has preferably been developed by the time of use of the plate or mat. Hydrophobicization subsequent to pressing can also be accelerated by addition of catalytically active substances. All compounds known to those skilled in the art for activating functional organosilicon compounds, for example Brønsted or Lewis acids, can be used for this purpose. Examples of Brønsted acids are hydrochloric acid, sulfuric acid or nitric acid, with preference being given to using hydrochloric acid as Brønsted acid. Lewis acids which can be used are, for example, tin or titanium compounds such as tin alkoxides or titanium alkoxides.

Use

The moldings according to the invention are used as thermal and/or acoustic insulating materials, and are preferably used for thermal insulation. Thus, the moldings according to the invention can, for example, be used as filling for hollow building blocks. They can likewise be used as vacuum insulation panels after envelopment and subsequent removal of gases. In particular, the moldings according to the invention can be used for producing insulation elements for direct acoustic and thermal insulation on walls of buildings and ceilings. Use outside building applications, for example in electrical appliances, refrigeration appliances, in the automobile sector or aircraft sector, is also possible. Due to the good mechanical stability, handling of the moldings is simplified.

The moldings produced according to the invention are preferably used as thermal insulation system, for example by application to a wall, e.g. by adhesive bonding, by mechanical fastening by means of pegs, screws or further possibilities known to a person skilled in the art for installation of thermal insulation systems. The hydrophobic, siliceous, insulating moldings are preferably used where good insulating action (thermal and acoustic) in combination with hydrophobicity and low combustibility is required.

EXAMPLES

In the following examples, all amounts and percentages are by weight, all pressures are 0.10 MPa (abs.) and all temperatures are 20° C., unless indicated otherwise in the particular case.

Density

The density of the plate was calculated from the weight of the plate and the plate volume. The volume of the plate was calculated from the external dimensions of the plate. The density is, unless indicated otherwise, reported in grams per liter (g/l).

Determination of the Thermal Conductivity

In the production of plate-shaped bodies by means of a pressing operation, the thermal conductivity was determined at a temperature of 23° C. by a method based on DIN EN 12667:2001 on an A206 instrument from Hesto on plates having the dimensions 11×11×2 cm.

Qualitative Test for Hydrophobicity

The assessment of the hydrophobicity was carried out two weeks after pressing. For this purpose, pieces having a size of about 5 mm were cut out using a sharp knife. 1 g of these pieces was introduced into 100 ml of water and stored in a closed vessel for 24 hours. The assessment is carried out as follows:

+ Hydrophobic: the pieces of the plate are barely wettable by water and float completely on the water surface.
○ Partially hydrophobic: the pieces of the plate are wettable, but mostly float on the water surface.
− Not hydrophobic: the pieces of the plate are immediately wettable and sink downward in the water within a few minutes.

Fracture Force

The fracture force, i.e. the force until fracture of the insulation plate occurs, was determined by a method based on DIN 53 423 (3-point bending test). For this purpose, a BTC-FR010TH.A50 instrument from Zwick/Roell was used. The span width between the supports in the measurement is 100 mm, and the dimensions of the plates are 110×110 mm. The thickness of the plates is 20 mm (for precise value, see table). The fracture force is reported in newtons (N).

Determination of the Carbon Content

The determination of the carbon content (C content) of the samples was carried out on a Leco CS 230 analyzer. The analysis was carried out by high-frequency combustion of the sample in a stream of oxygen. Detection was carried out by means of nondispersive infrared detectors.

Sources:

HDK® T30: hydrophilic, pyrogenic silica from Wacker Chemie AG having a BET surface area of 300 m$^2$/g.

HDX® 830: hydrophobic, pyrogenic silica from Wacker Chemie AG having a BET surface area of 270-320 m$^2$/g, a density of about 40 g/l and a C content of 1.4-2.6%.

HDE® 8H18: hydrophobic, pyrogenic silica from Wacker Chemie AG having a BET surface area of 170-230 m$^2$/g, a density of about 50 g/l and a C content of 4-5.2%.

OH-term. PDMS: OH-terminated polydimethylsiloxane from Wacker Chemie AG having a kinematic viscosity in the region of about 35 mm$^2$/s.

Methyltriethoxysilane: WACKER® SILAN M1-TRI-ETHOXY from Wacker Chemie AG.

Dimethyldiethoxysilane: WACKER® SILAN M2-DI-ETHOXY from Wacker Chemie AG.

All further laboratory chemicals were procured from Sigma-Aldrich.

Digested viscose staple fibers having a length of 6 mm and a diameter of 9 μm were used for armoring.

All further laboratory chemicals were procured from customary suppliers.

Production of the Silica-Containing Mixture

Method A

The mixture consisting of silica and additives was intensively stirred at 25° C. for 10 minutes, so that the material was fluidized. The organosiloxane was atomized through a two-fluid nozzle and sprayed onto the fluidized silica. After coating, the fibers were added and the mixture was intensively mixed for a further 2 minutes in a high-speed mixer (4000 rpm). This gave a mixture which was stored at room temperature for a maximum of 3 days before compaction.

Method B

10% of the mixture to be used, consisting of silica and additives, was intensively stirred at 25° C. for 10 minutes, so that the material was fluidized. The organosiloxane was subsequently added dropwise to the mixture while stirring. In selecting the stirrer and the stirring time, attention was paid to ensuring that very little organosiloxane remained on the vessel walls. This could, for example, be checked by coloring the organosiloxane and by weighing the resulting mixture and if necessary optimized.

After coating, a free-flowing powder (masterbatch) was obtained.

In a larger stirring apparatus, the remaining amount of the mixture consisting of silica and additives was intensively stirred at room temperature. The masterbatch was sprinkled into this mixture while stirring. The fibers were subsequently added with intensive stirring (high-speed mixer, 4000 rpm) and the mixture was intensively mixed for 2 minutes. This gave a mixture which was stored at room temperature for a maximum of 3 days before compaction.

Mixture A:
800 g of HDK T30
150 g of OH-terminated polydimethylsiloxane (viscosity 35 mm$^2$/s)
50 g of viscose staple fibers Mixture B:
800 g of HDK T30
50 g of silicon carbide 100 g of OH-terminated polydimethylsiloxane (viscosity 35 mm²/s) 50 g of viscose staple fibers Mixture C:
875 g of HDK T30
75 g of OH-terminated polydimethylsiloxane (viscosity 35 mm²/s)
50 g of viscose staple fibers Example 1

60 g of the mixture A, produced by method A, were introduced into a pressing mold having the dimensions 11×11 cm, with care being taken to ensure a uniform bed height. The mixture was subsequently brought to a thickness of 2 cm by means of a manual hydraulic press. The plate displayed good mechanical stability and could be taken undamaged from the mold without problems. After removal from the mold, the thickness was measured (see table 1).

Example 2

60 g of the mixture A, produced by method B, were introduced into a pressing mold having the dimensions 11×11 cm, with care being taken to ensure a uniform bed height. The mixture was subsequently brought to a thickness of 2 cm by means of a manual hydraulic press. The plate displayed good mechanical stability and could be taken undamaged from the mold without problems. After removal from the mold, the thickness was measured (see table 1).

Example 3

60 g of the mixture B, produced by method A, were introduced into a pressing mold having the dimensions 11×11 cm, with care being taken to ensure a uniform bed height. The mixture was subsequently brought to a thickness of 2 cm by means of a manual hydraulic press. The plate displayed good mechanical stability and could be taken undamaged from the mold without problems. After removal from the mold, the thickness was measured (see table 1).

Example 4

85.0 g of hydrophilic silica (HDK T30) were intensively stirred at 25° C. for 10 minutes, so that the material was fluidized. 15.0 g of an OH-terminated polydimethylsiloxane (viscosity 35 mm²/s) were atomized through a two-fluid nozzle and sprayed onto the mixture. The plate is brittle, less mechanically stable compared to the plates containing fibers (Ex. 1) and has to be handled carefully during removal from the mold and during the analytical studies. A mixture was obtained which was stored at room temperature for a maximum of 3 days before compaction.

Example 5

60 g of the mixture A, produced by method A, were introduced into a pressing mold having the dimensions 11×11 cm, with care being taken to ensure a uniform bed height. Subatmospheric pressure was applied via the bottom plate covered with a filter nonwoven, as a result of which the material to be pressed was deaerated and thereby precompacted. The material was subsequently pressed using a punch to a thickness of 2 cm by means of a manual hydraulic press. The plate displayed good mechanical stability and could be taken undamaged from the mold without problems. After removal from the mold, the thickness was measured (see table 1).

Example 6

60 g of the mixture C, produced by method A, were introduced into a pressing mold having the dimensions 11×11 cm, with care being taken to ensure a uniform bed height. The mixture was subsequently brought to a thickness of 2 cm by means of a manual hydraulic press. The plate displayed good mechanical stability and could be taken undamaged from the mold without problems. After removal from the mold, the thickness was measured (see table 1). The plate displayed a somewhat lower hydrophobicity because of the smaller proportion of hydrophobicizing agent.

Example 7

A freshly produced insulation plate as per example 1 was cut by means of a bandsaw into strips of about 5 mm (offcuts). 80 g of a freshly produced mixture A produced by method A were mixed with 20 g of the offcuts for 3 minutes in a high-speed mixer (4000 rpm). 60 g of this mixture were introduced into a pressing mold having the dimensions 11×11 cm, with care being taken to ensure a uniform bed height. The mixture was subsequently brought to a thickness of 2 cm by means of a manual hydraulic press. The plate displayed good mechanical stability and could be taken undamaged from the mold without problems. After removal from the mold, the thickness was measured (see table 1).

Example 8

In a round-bottom flask, 11 g of dimethyldiethoxysilane, 0.5 g of Ti(OiPr)$_4$ and 10 g of HDK T30 were mixed to form a free-flowing powder. This powder mixture was mixed further for 60 minutes with a further 45 g of HDK T30 in a high-speed mixer (4000 rpm). 3.3 g of viscose staple fibers were subsequently added. The mixing procedure was continued for 2 minutes. The powder mixture was subsequently transferred to a pressing mold having the dimensions 11×11 cm and compacted to a thickness of 2 cm by means of a hydraulic press. The plate displayed good mechanical stability and could be removed undamaged from the mold without problems. The plates were stored at 25° C. for 2 weeks before further analysis.

Example 9

In a round-bottom flask, 6 g of methyltriethoxysilane, 6 g of dimethyldiethoxysilane, 0.5 g of Ti(OiPr)$_4$ and 10 g of HDK T30 were mixed to form a free-flowing powder. This powder mixture was mixed further for 60 minutes with a further 40 g of HDK T30 in a high-speed mixer (4000 rpm). 3.3 g of viscose staple fibers were subsequently added. The mixing procedure was continued for 2 minutes. The powder mixture was subsequently transferred to a pressing mold having the dimensions 11×11 cm and compacted to a thickness of 2 cm by means of a hydraulic press. The plate displayed good mechanical stability and could be removed undamaged from the mold without problems. The plates were stored at 25° C. for 2 weeks before further analysis.

Comparative example 1 (not according to the invention) 60 g of the mixture A, produced by method A, were introduced into a pressing mold having the dimensions 11×11 cm, with care being taken to ensure a uniform bed height. The mixture was subsequently brought to a thickness of 2 cm by means of a manual hydraulic press. The plate was subsequently heated at 125° C. for 60 minutes. The plate displayed good mechanical stability and could be taken undamaged from the mold without problems. After removal from the mold, the thickness was measured (see table 1). The plate displayed, despite the additional heat treatment, a comparable hydrophobicity to example 1 according to the invention in which a subsequent heat treatment was omitted.

Comparative example 2 (not according to the invention) 100 g of the mixture A, produced by method A, were stored at 60° C. for 6 hours. 60 g of this mixture were subsequently introduced into a pressing mold having the dimensions 11×11 cm, with care being taken to ensure a uniform bed height. The mixture was subsequently brought to a thickness of 2 cm by means of a manual hydraulic press. The plates displayed, compared to the examples according to the invention having the same content of hydrophobicizing agent, a significantly lower mechanical stability and could be removed undamaged from the mold only by careful handling. For the analytical tests, only intact plates were used; in order to obtain these, a number of plates were produced as required. After removal from the mold, the thickness was measured (see table 1).

Comparative example 3 (not according to the invention) 800 g of HDK T30 were intensively stirred at 25° C. for 10 minutes, so that the material was fluidized. 150 g of the OH-terminated polydimethylsiloxane (viscosity 35 mm$^2$/s) were atomized through a two-fluid nozzle and sprayed onto the fluidized silica. After coating, the mixture was stored at 25° C. for 3 months. The stored, coated silica and 50 g of viscose staple fibers were subsequently intensively mixed for 2 minutes in a high-speed mixer (4000 rpm). 60 g of this mixture were subsequently introduced into a pressing mold having the dimensions 11×11 cm, with care being taken to ensure a uniform bed height. The mixture was subsequently brought to a thickness of 2 cm by means of a manual hydraulic press. The plates displayed, compared to the examples according to the invention having the same content of hydrophobicizing agent, a significantly lower mechanical stability and could be removed undamaged from the mold only by careful handling. For the analytical tests, only intact plates were used; in order to obtain these, a number of plates were produced as required. After removal from the mold, the thickness was measured (see table 1).

Comparative example 4 (not according to the invention) 95.0 g of hydrophobic silica (HDK H18) and 5.0 g of viscose staple fibers were intensively mixed at 25° C. for 2 minutes (high-speed mixer, 4000 rpm). 60 g of this mixture were subsequently introduced into a pressing mold having the dimensions 11×11 cm, with care being taken to ensure a uniform bed height. The mixture was subsequently brought to a thickness of 2 cm by means of a manual hydraulic press. The plates displayed, compared to the examples according to the invention, a significantly lower mechanical stability and could be removed undamaged from the mold only by careful handling. For the analytical tests, only intact plates were used; in order to obtain these, a number of plates were produced as required. After removal from the mold, the thickness was measured (see table 1).

Comparative example 5 (not according to the invention) 95.0 g of hydrophobic silica (HDK H30) and 5.0 g of viscose staple fibers were intensively mixed at 25° C. for 2 minutes (high-speed mixer, 4000 rpm). 60 g of this mixture were subsequently introduced into a pressing mold having the dimensions 11×11 cm, with care being taken to ensure a uniform bed height. The mixture was subsequently brought to a thickness of 2 cm by means of a manual hydraulic press. The plates displayed, compared to the examples according to the invention, a significantly lower mechanical stability and could be removed undamaged from the mold only by careful handling. For the analytical tests, only intact plates were used; in order to obtain these, a number of plates were produced as required. After removal from the mold, the thickness was measured (see table 1).

Comparative example 6 (not according to the invention) 95.0 g of hydrophilic silica (HDK T30) and 5.0 g of viscose staple fibers were intensively mixed at 25° C. for 2 minutes (high-speed mixer, 4000 rpm). 60 g of this mixture were subsequently introduced into a pressing mold having the dimensions 11×11 cm, with care being taken to ensure a uniform bed height. The mixture was subsequently brought to a thickness of 2 cm by means of a manual hydraulic press. The plate displayed good mechanical stability and could be removed undamaged from the mold without problems. After removal from the mold, the thickness was measured (see table 1). The plate is not hydrophobic.

Comparative example 7 (not according to the invention) 60 g of a hydrophobic HDK (HDK H18) were introduced into a pressing mold having the dimensions 11×11 cm, with care being taken to ensure a uniform bed height. The mixture was subsequently brought to a thickness of 2 cm by means of a manual hydraulic press. After removal from the mold, the thickness was measured (see table). The plate could, despite many attempts, not be removed from the mold undamaged and analyzed because of the low mechanical stability, and so no further analysis apart from the test for hydrophobicity could be carried out. Compared to the example according to the invention without fibers (example 4), the mechanical stability of the pieces obtained must be classified as significantly lower.

TABLE 1

Analytical data

| Example | Plate thickness [mm] | Density [g/l] | λ value [mW/K*m] | Fracture force [N] | Hydrophobicity |
|---|---|---|---|---|---|
| 1 | 20.1 | 247 | 23.0 | 69 | + |
| 2 | 20.4 | 243 | 22.5 | 70 | + |
| 3 | 20.0 | 248 | 22.2 | 68 | + |
| 4 | 20.3 | 244 | 21.5 | 11 | + |
| 5 | 19.9 | 249 | 22.8 | 71 | + |
| 6 | 20.0 | 248 | 21.5 | 79 | o |
| 7 | 20.3 | 244 | 22.8 | 62 | + |
| 8 | 20.8 | 258 | 21.1 | 87 | + |
| 9 | 19.8 | 242 | 21.4 | 68 | + |
| Comp. 1* | 20.2 | 245 | 22.9 | 68 | + |
| Comp. 2* | 20.3 | 244 | 21.8 | 48 | + |
| Comp. 3* | 20.5 | 242 | 21.4 | 52 | + |
| Comp. 4* | 20.4 | 243 | 22.4 | 41 | + |
| Comp. 5* | 19.8 | 250 | 20.5 | 55 | + |
| Comp. 6* | 20.3 | 244 | 21.9 | 93 | − |
| Comp. 7* | Plates disintegrate | Plates disintegrate | Plates disintegrate | Plates disintegrate | + |

*not according to the invention

The invention claimed is:

1. A method for producing mechanically stable hydrophobic silica moldings, comprising:
   i) coating a mixture containing hydrophilic silica with at least one hydrophobicizing agent at a temperature of not more than 55° C.; and
   ii) compacting the mixture from step i) after a storage time of not more than 30 days, to create moldings, iii) wherein the temperature is not more than 55° C. during steps i) and ii) and up to use of the moldings, and wherein the moldings produced in step ii) are mechanically stable moldings having a density of from 100 to 400 g/L.

2. The method of claim 1, wherein the moldings are plates or mats.

3. The method of claim 1, wherein the hydrophobicizing agents are reactive organosilanes, organosiloxanes or silicone resins having hydrophobicizing properties, which are liquid at 25° C. and are capable of reacting with Si—OH groups of the silica surface.

4. The method of claim 1, wherein the hydrophobicizing agents are OH-terminated polydimethylsiloxanes having a kinematic viscosity measured at 25° C. of from 5 mm$^2$/s to 100 mm$^2$/s.

5. The method of claim 1, wherein the hydrophilic silica is pyrogenic silica, precipitated silics or mixture thereof having a BET surface area in accordance with DIN 66131 in the range from 100 to 500 m$^2$/g.

6. The method of claim 1, wherein, in step i, the hydrophilic silica is coated with from 0.5% to 20% by weight of hydrophobicizing agent, based on the weight of the total mixture.

7. The method of claim 1, wherein the mixture is stored for not more than 15 days after step i) and before the compaction in step ii).

8. The method of claim 1, wherein the mixture from step i) is deaerated before compaction to a target density.

9. The method of claim 1, wherein residues obtained in the method of claim 1 and/or during the use of moldings are recirculated into the method of claim 1.

10. The method of claim 1, wherein the hydrophobicizing agent in the mixture from step i) has not completely reacted with surface silanol groups of the silica prior to compaction in step ii).

11. The method of claim 1, wherein the moldings are insulation boards.

12. The method of claim 1, wherein the moldings are thermal insulators having a thermal conductivity of 18 to 35 mW/m·K.

13. The method of claim 1, wherein prior to compacting in step ii), an IR opacifier, electrostatic charge—reducing agent, or both of these are added.

14. The method of claim 1, wherein compacting in step ii) takes place within 24 hours of step i).

15. A method for producing hydrophobic silica moldings, comprising:
   iv) coating a mixture containing hydrophilic silica with at least one hydrophobicizing agent at a temperature of not more than 55° C.; and
   v) compacting the mixture from step i) after a storage time of not more than 30 days, to create moldings,
   vi) wherein the temperature is not more than 55° C. during steps i) and ii) and up to use of the moldings,
further comprising adding fibers to the mixture before step ii).

16. The method of claim 15, wherein the moldings produced in step ii) are mechanically stable moldings having a density of from 100 to 400 g/L.

17. The method of claim 15, wherein the hydrophobicizing agent in the mixture from step i) has not completely reacted with surface silanol groups of the silica prior to compaction in step ii).

18. The method of claim 15, wherein the moldings are insulation boards.

19. The method of claim 15, wherein prior to compacting in step ii), an IR opacifier, electrostic charge—reducing agent, or both of these are added.

* * * * *

UNITED STATES PATENT AND TRADEMARK OFFICE
CERTIFICATE OF CORRECTION

| | |
|---|---|
| PATENT NO. | : 11,535,727 B2 |
| APPLICATION NO. | : 16/338196 |
| DATED | : December 27, 2022 |
| INVENTOR(S) | : Konrad Hindelang et al. |

It is certified that error appears in the above-identified patent and that said Letters Patent is hereby corrected as shown below:

In the Claims

Column 15, Line 17, Claim 5:
After "is pyrogenic silica, precipitated"
Delete "silics" and
Insert -- silica --.

Signed and Sealed this
Twelfth Day of December, 2023

*Katherine Kelly Vidal*

Katherine Kelly Vidal
*Director of the United States Patent and Trademark Office*